Sept. 13, 1927.  B. J. GOLDSMITH ET AL  1,642,020
WINDOW REGULATOR
Filed May 28, 1925   2 Sheets-Sheet 1

INVENTORS
Bertram J. Goldsmith.
Emil Koeb.
BY
ATTORNEYS.

Sept. 13, 1927. 1,642,020
B. J. GOLDSMITH ET AL
WINDOW REGULATOR
Filed May 28, 1925   2 Sheets-Sheet 2

INVENTORS.
Bertram J. Goldsmith.
Emil Koeb.
BY Townsend & Decker
ATTORNEYS.

Patented Sept. 13, 1927.

1,642,020

UNITED STATES PATENT OFFICE.

BERTRAM J. GOLDSMITH AND EMIL KOEB, OF NEW YORK, N. Y., ASSIGNORS TO PERFECT WINDOW REGULATOR CORPORATION, OF LONG ISLAND CITY, NEW YORK, A CORPORATION OF DELAWARE.

WINDOW REGULATOR.

Application filed May 28, 1925. Serial No. 33,377.

This invention relates to improvements in the art of window controlling mechanisms particularly designed for use in closed automobile constructions.

One of the primary objects of the invention is to provide a positive stop mechanism to hold the window in an adjusted position and one which can be controlled with a minimum of effort on the part of the operator.

It is a further object to provide a coordinated control mechanism to cooperate with the main stop mechanism to prevent the window from moving continuously through its entire range of movement.

A still further object is to provide instrumentalities for accomplishing the above functions which will be relatively simple in construction and not likely to become out of order when in use.

Other and more specific objects will appear from the following description considered in connection with the drawings in which.

According to this invention it is contemplated to have an upwardly tensioned mechanism supporting a window such that when the window is released it will be moved to closed position. The movement of the window may be stopped at any desired point by means of a simple hand actuating mechanism which will overcome the tendency of the first mentioned mechanism. In order that the window will not rise too rapidly when released an additional stop device is provided to intermittently check the upward movement of the window when released by the stop mechanism. This will appear more fully from the following detailed description.

Figure 1:
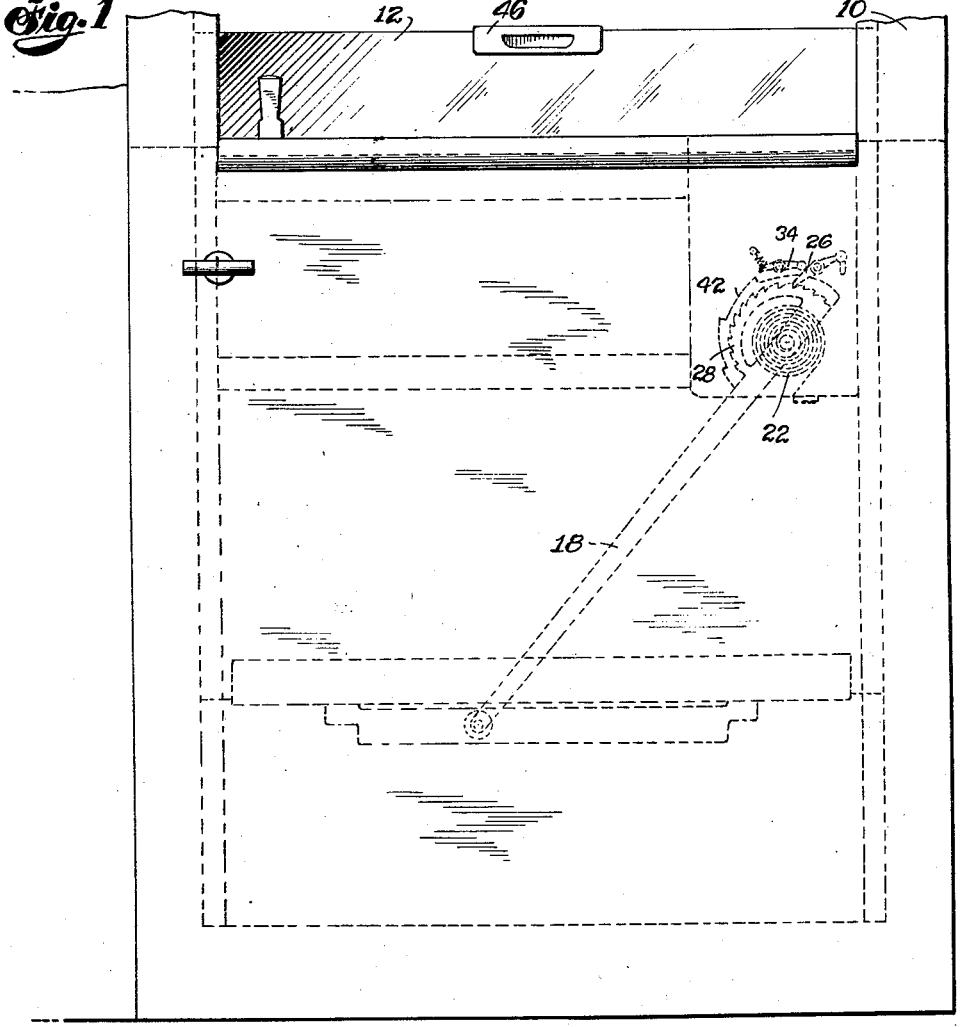
Fig. 1 represents an elevational view of a section of an automobile door embodying our invention.
Figure 2:
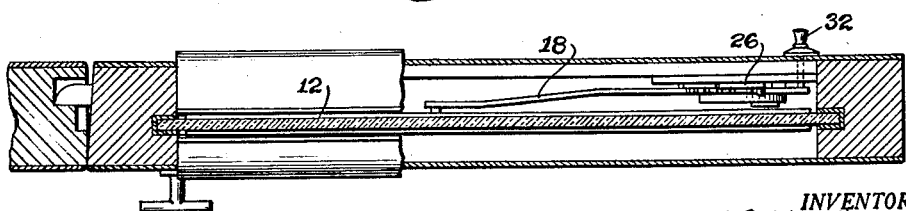
Fig. 2 is a horizontal view thereof.
Figure 3:
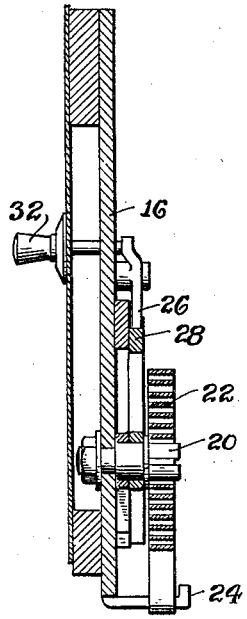
Fig. 3 is a detail sectional view through the controlling mechanism on the line 3—3 of Fig. 4.

In the drawings there is disclosed certain parts of an automobile frame member 10 shown as an automobile door including the usual window opening in the upper portion thereof and a lower window well beneath said opening so that the window 12 may be moved upwardly into position to obstruct the window opening or lowered into the window well as shown in dotted lines, in Fig. 1. The door includes the usual latch mechanism and other operative parts which may be constructed in any desired manner as the details thereof form no part of our present invention.

For the purpose of controlling the position of the window 12 we provide the controlling mechanism indicated in general by the numeral 14. This mechanism is preferably mounted entirely upon a supporting plate 16 capable of being attached to the supporting frame 10 so as to be capable of being mounted thereon as a unit. The controlling mechanism includes the operating arm 18 pivoted upon the shaft 20 carried by the plate 16. The operating arm 18 in the construction shown extends to and engages within a guide member carried by a portion of the window although the arm may be attached thereto in any other manner if preferred. For the purpose of tensioning the arm upwardly so that the same will move the window to closed position the pivot shaft 20 has coiled thereabout a helical spring 22 suitably mounted thereon and supported by an extension 24 of the plate 16. The strength of the spring 22 is preferably such that the window 12 is moved thereby from open to closed position.

For the purpose of preventing the upward movement of the window so that the same may be retained open to any desired extent we provide a main latch mechanism comprising the ratchet lever 26 cooperating with a series of ratchet teeth 28 formed on an arcuate plate 27 movable with the arm 18 and in the construction shown formed as an integral part thereof. The lever 26 has one end 30 thereof normally engaging the teeth 28 the other or controlling end thereof extending to a position outside of the automobile door and provided with a handle 32 so as to be readily movable to latched or unlatched position. It is apparent that by means of this construction when the window is lowered to any desired extent it will be held in such position by means of the latch 26 until manually released by the handle 32.

Figure 4:
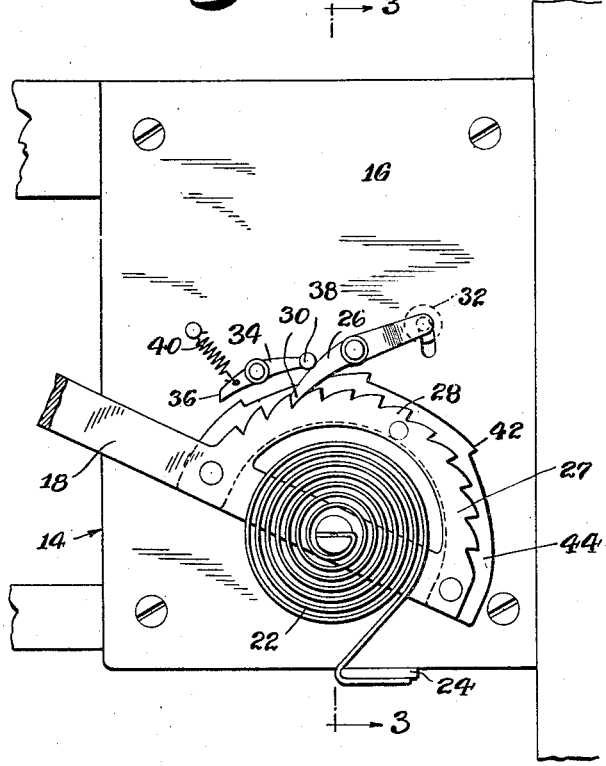
Fig. 4 is an enlarged elevational view of the controlling mechanism.
Figure 5:
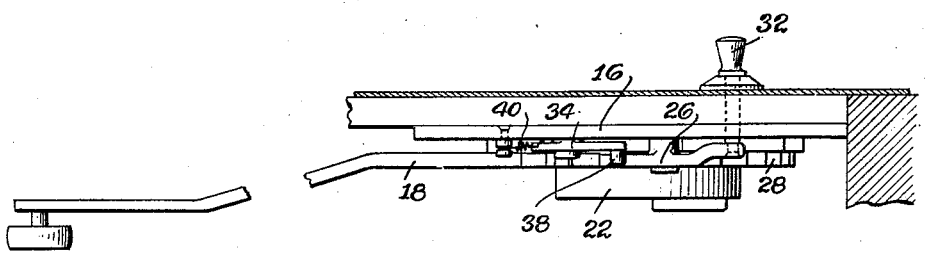
Fig. 5 is a transverse sectional view looking down from the structure in Fig. 4.

In order to prevent the window from rising too rapidly when released there is preferably provided a secondary latch mechanism including the latch lever 34 coordinated with the main latch 26 as set forth below. The lever 34 includes a latching cam 36 and an operating portion 38 having a cross member formed thereon to insure engagement thereof with the lever 26. The lever 34 may be held in inoperative position as shown for example in Fig. 4 by means of a spring 40 or in any other preferred manner. The cam 36 is designed for engagement with a series of widely spaced teeth 42 mounted on a second plate 44 attached to and movable with the plate 27 and arm 18. Any desired number of teeth 42 may be provided the function thereof being set forth below.

The window 12 may be provided with any preferred type of hand operating element 46 to facilitate lowering of the window. It is obvious that if desired this could be formed as an integral part of the window without departing from our invention.

The operation of the device is as follows:

When it is desired to lower the window the operator may accomplish this by means of the hand grip 46. When the window has been lowered to the desired extent it is released and is automatically held in that position by means of the latch member 26, the cam end 30 of which engages against one of the teeth 28, the spring 40 holding the cam end 30 in its engaged position. Since the spring 22 tends to move the window upwardly it is only necessary that the latch 28 prevent movement of the arm 18 in one direction, namely upwardly. When it is desired to raise the window the hand lever 32 is lowered thereby swinging the lever 26 about its pivot to release the locking cam 30 from its engagement with the ratchet teeth 28. A clock-wise movement of the lever 26, as viewed in Fig. 4, when the arm is being moved to unlatched position, causes a counter-clock-wise rotation of the lever 34 so as to cause the cam 36 to be moved into engagement with the plate 44. The spring 22 then causes the window to move upwardly until one of the teeth 42 engages the cam 36 when the upward movement will be arrested. The lever 26 may then be released to cause the latch 30 to engage one of the teeth 28 to hold the window in the position into which it had been moved, the spring 40 disengaging the lever 34 from the engaged tooth 42. If it is desired to close the window further the hand lever is again moved downwardly to release the latch 26 from engagement with the rack 28 and the lever 18 swings upwardly again unless or until another of the teeth 42 engages the cam 36 on lever 34. This operation may be repeated until the window has reached its upper-most position or the window may be locked at any time by releasing the handle 32 so that the spring 40 will move the cam 30 into locking position the parts remaining in that position until again manually released.

It is preferred as in the construction shown that the levers 26 and 34 be so proportioned and associated that there is an intermediate position thereof in which neither the cam end 30 nor 36 will engage the teeth 28 or 42 so as to permit the window to rise continuously from lowered to closed position.

While we have shown and described herein certain specific constructions it is to be understood that these are merely illustrative and that we are to be limited only as set forth in the appended claims.

We claim as our invention:

1. In combination with a frame member and a slidable window carried thereby, controlling mechanism for said window including means tending continuously to move said window upwardly, manually controlled means for preventing said first mentioned means from functioning and additional means operative when said manually controlled means are inoperative to prevent unlimited operation of said first named means.

2. In a window controlling mechanism, a movable operating member, means for moving said member in one direction, a primary controlling device to prevent said first mentioned means from functioning, and a secondary controlling device operating to intermittently prevent said first mentioned means from functioning.

3. In a window controlling mechanism, a movable operating member, means for moving said member in one direction, a primary controlling device to prevent said first mentioned means from functioning, and a secondary controlling device operating to intermittently prevent said first mentioned means from functioning and connecting means between said primary and secondary controlling devices to cause one of said devices to function as the other is rendered inoperative.

4. In a window controlling mechanism, a movable operating member, means for moving said member in one direction, a primary controlling device to prevent said first mentioned means from functioning, and a secondary controlling device operating to intermittently prevent said first mentioned means from functioning and connecting means between said primary and secondary controlling devices to cause one of said devices to function as the other is rendered inoperative and means for normally retaining one of said devices in operative position.

5. In a window controlling mechanism, a rotatable operating member, means tending constantly to rotate said member in one direction, a primary manually controlled controlling member adapted to prevent rotation of said operating member, and a secondary controlling member associated with said primary controlling device, and means operatively connected to said operating member and engageable by said secondary controlling device to intermittently prevent rotation of said operating member.

6. In a window controlling mechanism, a rotatable operating member, means tending constantly to rotate said member in one direction, a primary manually controlled controlling member adapted to prevent rotation of said operating member, and a secondary controlling member operated by said primary controlling device, and means operatively connected to said operating member and engageable by said secondary controlling device to intermittently prevent rotation of said operating member and connecting means between said primary and secondary devices to cause the latter to become operative as the former is rendered inoperative.

7. In a window controlling mechanism, a pivoted operating arm, means constantly tending to elevate said arm, releasable latch mechanism for holding said arm lowered to different degrees, and additional means controlled by said latch mechanism for preventing said arm from reaching its highest operative position.

8. In a window controlling mechanism, a pivoted operating arm, means tending to swing said arm in one direction about its pivot, a series of closely spaced stop devices, and a second series of more widely spaced stop devices, and manually controlled latch mechanism adapted to engage the stop devices of either series dependent upon the condition of said mechanism.

9. In a window controlling mechanism, a pivoted operating arm, means tending to swing said arm in one direction about its pivot, a series of closely spaced stop devices, and a second series of more widely spaced stop devices, and manually controlled latch mechanism adapted to engage the stop devives of either series dependent upon the position of said mechanism, said latch mechanism remaining free of all of said stop devices when in one position thereof.

10. In combination with a supporting structure, a slidable window carried thereby, counter-balancing means including a rotatable member associated with said supporting structure and said window tending to move said window upwardly, manually controlled releasable stop mechanism for preventing movement of said window in one direction only, and coordinated stop mechanism for preventing said window from reaching its closed position, said second mentioned stop mechanism being brought into operation by movement of said first mentioned stop mechanism to inoperative position.

11. In a window regulator, a pivoted operating arm, means for controlling the position of said arm, said means including a plurality of differently spaced ratchet teeth arranged in separate series and operatively associated with said regulator, manually releasable stop mechanism having means for engagement with either of said series of teeth, spring means for maintaining said mechanism normally in engagement with one of said series of teeth and means for moving said arm when released from said stop mechanism.

12. In a window regulator, a pivoted operating arm, means for controlling the position of said arm, said means including a plurality of differently spaced ratchet teeth arranged in separate series and operatively associated with said regulator, manually releasable stop mechanism having means for engagement with either of said series of teeth, spring means for maintaining said mechanism normally in engagement with one of said series of teeth, said stop mechanism including pivoted latch elements connected for coordinated movement and means for moving said arm when released from said stop mechanism.

13. In a window regulator, means for moving said window in one direction, means for arresting the movement of said window, auxiliary means for arresting the movement of said window, said two last named means each being rendered inoperative when the other is rendered operative.

14. In a window regulator, means for moving said window in one direction, means for arresting the movement of said window, auxiliary means for arresting the movement of said window, said two last named means being coordinated to operate one at a time.

15. In a window regulator, means for moving said window in one direction, means for arresting the movement of said window, auxiliary means for arresting the movement of said window, one of said two last named means being rendered operative upon the other of said means being rendered inoperative.

16. In a window regulator, means for moving said window in one direction, means for arresting the movement of said window at various positions, and coordinated means for releasing said arresting means and rearresting said window.

Signed at New York, in the county of New York, and State of New York, this 27th day of May, A. D. 1925.

EMIL KOEB.
BERTRAM J. GOLDSMITH.